United States Patent [19]
Fukuchi

[11] Patent Number: 5,396,356
[45] Date of Patent: Mar. 7, 1995

[54] COLOR LIQUID CRYSTAL DEVICE WITH NON-DRIVING ELECTRODES UNDER THE SEALANT FOR PROVIDING AN EVEN CELL GAP

[75] Inventor: Takakazu Fukuchi, Tokyo, Japan
[73] Assignee: Seiko Instruments Inc., Japan
[21] Appl. No.: 6,460
[22] Filed: Jan. 21, 1993
[30] Foreign Application Priority Data
Jan. 29, 1992 [JP] Japan .................. 4-014261
[51] Int. Cl.⁶ ............... G02F 1/1339; G02F 1/1343
[52] U.S. Cl. ........................ 359/80; 359/54; 359/87; 359/68
[58] Field of Search ............ 359/68, 87, 54, 80, 359/62

[56] References Cited

U.S. PATENT DOCUMENTS

| | | | |
|---|---|---|---|
| 4,593,977 | 6/1986 | Takamatsu et al. | 359/68 |
| 4,600,273 | 7/1986 | Ohno | 359/80 |
| 4,854,675 | 8/1989 | Yamagaki et al. | 359/87 |
| 4,855,724 | 8/1989 | Yang | 359/68 |
| 5,202,778 | 4/1993 | Niki | 359/87 |

FOREIGN PATENT DOCUMENTS

| | | |
|---|---|---|
| 57-112712 | 7/1982 | Japan . |
| 63-104025 | 10/1986 | Japan . |
| 1015719 | 1/1989 | Japan . |
| 2039027 | 2/1990 | Japan . |
| 2181119 | 7/1990 | Japan . |
| 2187724 | 7/1990 | Japan . |
| 2250032 | 10/1990 | Japan . |
| 3024523 | 2/1991 | Japan . |
| 3211524 | 9/1991 | Japan . |

*Primary Examiner*—William L. Sikes
*Assistant Examiner*—Kenneth Parker
*Attorney, Agent, or Firm*—Bruce L. Adams; Van C. Wilks

[57] ABSTRACT

A color electrooptical device includes a color filter substrate and a transparent substrate being spaced apart and facing each other. The color filter substrate has a color filter layer and a transparent electrode pattern and the transparent substrate has a transparent electrode pattern. Liquid crystal material is sealed between the two substrates through a sealing portion. A non-driving transparent electrode is interposed between the sealing portion and the color filter substrate and a non-driving transparent electrode is interposed between the sealing portion and the transparent substrate to provide and maintain a uniform cell gap between the two substrates. A method of manufacturing the color electrooptical device is also disclosed.

2 Claims, 4 Drawing Sheets

FIG. 1a  FIG. 1b
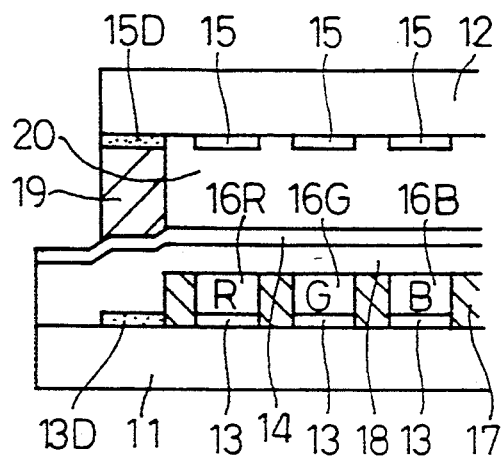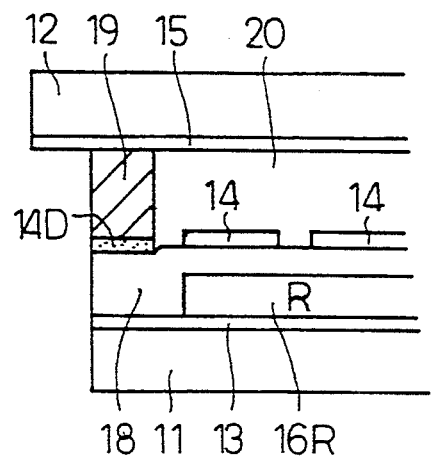
FIG. 2
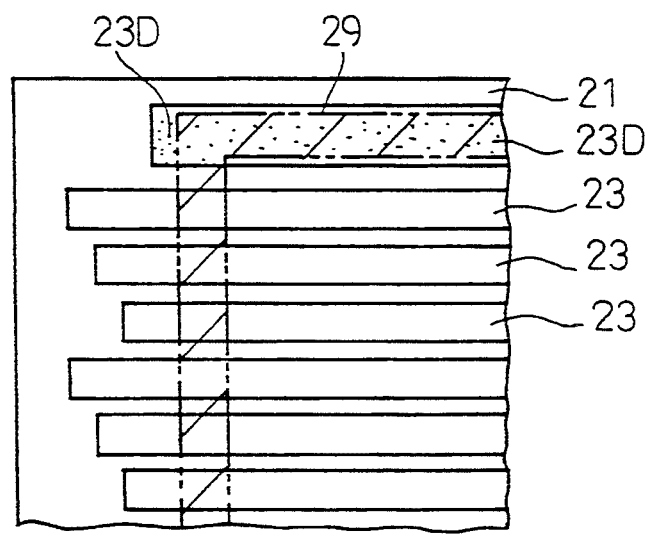

COLOR LIQUID CRYSTAL DEVICE WITH NON-DRIVING ELECTRODES UNDER THE SEALANT FOR PROVIDING AN EVEN CELL GAP

BACKGROUND OF THE INVENTION

1. Field of the Invention

The present invention relates to a color liquid crystal electro-optical device used for personal computers, pocket television and the like.

2. The Prior Art

FIG. 5 is a sectional view of a conventional color liquid crystal electro-optical device. FIGS. 5(a) and (b) are sectional views shown the device viewed from angles rotated at an angle of 90° respectively. The structure of this color liquid crystal electro-optical device is as follows. A transparent electrode 53 patterned is disposed on the surface of a glass substrate 51. The color filters 56R, 56G, 56B are in order provided the transparent-electrodes 53. A black matrix 57 is provided between the gap of the color filters.

Furthermore, an overcoat layer 58 is provided on the color filters and the black matrix. A patterned transparent electrode 54 is provided on the surface of the overcoat layer 58.

Another transparent substrate 52 faces the color filter substrate 51. A patterned transparent electrode 55 is provided on the surface of the transparent substrate 52. The two substrates are adhered to each other with a sealing material 59 to define and a space to enclose liquid crystal 60 between the two substrates.

Basic structure of a liquid crystal cell of a color liquid crystal electro-optical device is explained above. As a general structure, a color liquid crystal electro-optical device has polarizing plates adhered to each exterior side the said color filter substrate and the transparent substrate, a power supply unit to drive the liquid crystal, a controller unit and a backlight unit.

The transparent electrode pattern 53 is provided under the color filters 56R, 56G and 56B of said color filter substrate, and the electrode pattern 53 is required when the color filters are formed by a paticular color filter manufacturing method, namely, the high polymer electro-deposition method or the micell electrolytic method. In using color filters made by the dyeing method, the printing method or the pigment distribution method, the transparent electrode pattern 53 is unnecessary and not provided.

Recently, the STN (Super Twisted Nomatic) mode having excellent electro-optical properties is in most cases applied to the liquid crystal cell of the color liquid crystal electro-optical device. Especially, in the majority of the color liquid crystal electro-optical devices for personal computers, the STN mode is adopted because of its large size and high resolution.

One of the most important requirements for the STN mode liquid crystal cell is the uniformity of the cell gap.

The cell gap is the thickness of the liquid crystal 60 sealed between the substrates in FIG. 5. The cell gap between the color filter substrate 51 and the opposing substrate 52 is controlled carefully by the sealing material 59 and spherical fine powder called a gap control material.

The uniformity required for the cell gap is below ±0.1 μm. If the uniformity of the cell gap becomes over ±0.1 μm, this non-uniformity of the color liquid crystal electro-optical device usually causes deterioration of the visible properties, and results in problems such as irregular tone and low contrast.

Generally, each transparent electrode 53, 54 and 55 provided in the liquid crystal cell of the color liquid crystal electro-optical device shown in FIG. 5 has a film thickness ranging from 0.10 μm to 0.30 μm. Particularly, the film thickness of the transparent electrodes 54 and 55, because of lowering the value of their resistance, tend to get thick, so the film thickness is over 0.2 μm at present.

However, in the structure of the conventional liquid crystal cell, at the sealing portion where the sealing material 59, which is important to control the cell gap, is provided, in some portion the patterned transparent electrodes 53, 54 and 55 are provided, but in other portions those are not provided. This causes a serious defect in regards of uniformity of the cell gap.

SUMMARY OF THE INVENTION

Accordingly, it is an object of the present invention to provide a color liquid crystal electrooptical device having a uniformly controlled cell gap, which obtains good contrast and good picture quality.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

The invention disclosed herein will be understood better with reference to the following drawings:

FIGS. 1a and 1b are the sectional view of the inventive color liquid crystal display device from two different angles;

FIG. 2 is a plan view of another embodiment of the present invention showing the glass substrate and transparent electrode pattern to prepare the color filter by the high polymer electro-deposition method;

DETAILED DESCRIPTION OF THE PREFERRED EMBODIMENTS

This invention will be described in further detail by way of example with reference to the accompanying drawings.

Embodiment 1

Figure 3:
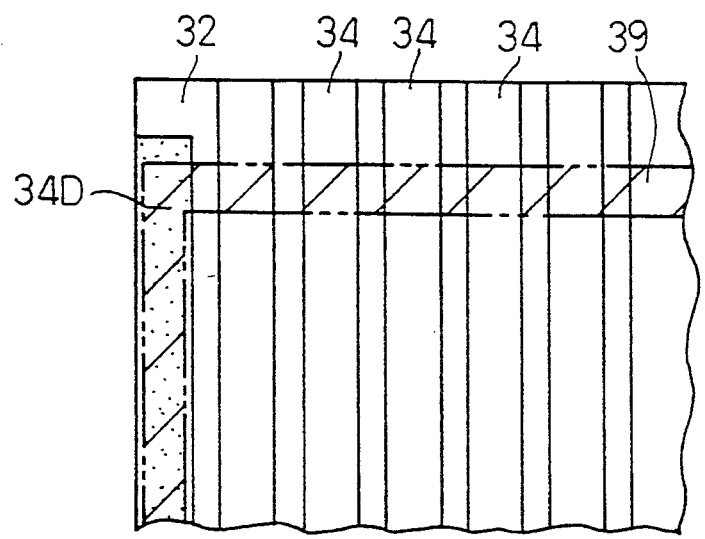
FIG. 3 is a plan view showing another embodiment of the present invention showing the color filter substrate including the transparent electrode pattern provided on the color filter substrate.
Figure 4:
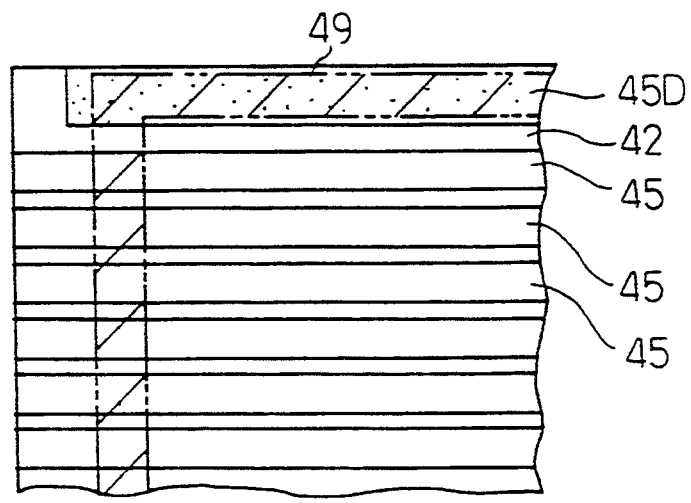
FIG. 4 is a plan view showing one of the embodiments of the opposing glass substrate which includes the transparent electrode pattern.
Figure 5A:
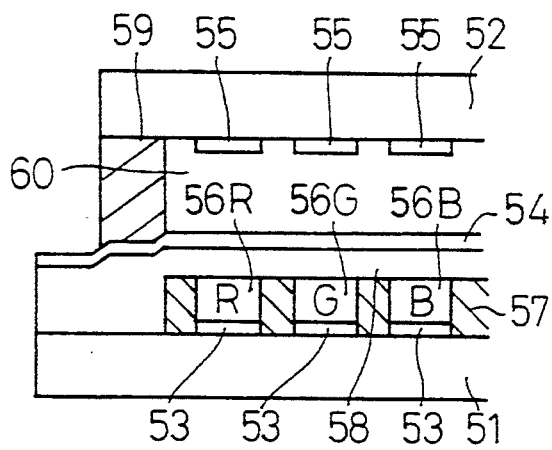
FIGS. 5a and 5b are sectional views showing the liquid crystal cell of the color liquid crystal display device of the prior art from two different angles.
Figure 5B:
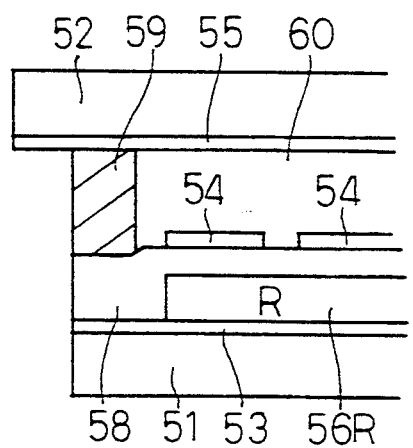

FIG. 1 is a sectional view of a liquid crystal cell employed for the present invention in a color liquid crystal display device. FIGS. 1a and 1b are cross sections, partly broken away, viewed from angles rotated at an angle of 90° respectively. FIG. 2 shows a color filter glass substrate 21 employed in the high polymer electro-deposition method, where a transparent electrode 23 is patterned. FIG. 3 shows a patterned transparent electrode which is provided on a color filter and an overcoat layer 39 formed on the color filter glass substrate. FIG. 4 shows a transparent electrode pattern 45 formed on the color filter glass substrate. FIG. 4 is the transparent electrode pattern which is formed on the glass substrate facing the color filter substrate. FIGS. 2, 3 and 4 are each a plan overview.

Three kinds of transparent electrode patterns are shown in FIGS. 2, 3 and 4 as a feature in this invention. FIG. 2 shows a transparent electrode pattern 23 for forming the color filter. A color filter is not formed on the transparent electrode pattern 23D, which constitutes a dummy or non-driving transparent electrode provide for controlling the cell gap The dummy or non-driving transparent electrode 23D corresponds to the transparent electrode pattern 13D provided under the position of the sealing material 19 shown in FIG. 1.

FIG. 3 shows a transparent electrode pattern 34 for driving liquid crystal on a color filter. A dummy or non-driving transparent electrode 34D which does not contribute to drive the liquid crystal, corresponds to the transparent electrode pattern 14D disposed at the position of the sealing material 19 shown in FIG. 1.

FIG. 4 shows a transparent electrode pattern 45 for driving liquid crystal which is at right angles to the transparent electrode pattern 34 of FIG. 3. A dummy or none-driving transparent electrode 45D corresponds to 15D of FIG. 1. The feature of this invention is to dispose the transparent electrode patterns 13D, 14D and 15D at the position of the sealing material 19. However, in case of the dyeing method, the printing method or the pigment distribution method, since these manufacturing methods of color filter do not require the transparent electrode pattern 13 and 23, the transparent electrode pattern 13D and 23D are unnecessary.

The color filter of high polymer electro-deposition method is formed on the transparent electrode pattern (ITO) shown in FIG. 2. This electrode pattern is manufactured by the evaporation film forming method and has a film resistance 20 $\Omega/\square$ and film thickness 0.1 $\mu$m. 23D is made with the same mask as 23 at the same time.

The transparent electrode pattern of FIG. 3 is manufactured by the sputtering film forming method and has a film resistance 10 $\Omega/\square$ and film thickness 0.25 $\mu$m. 34 and 34D are also patterned at the same time.

The transparent electrode patterns 45 and 45D of FIG. 4 are manufactured by the sputtering film forming method and have a film resistance 10 $\Omega/\square$ and film thickness 0.2 $\mu$m. The color filter substrate and the opposing glass substrate compose the liquid crystal cell shown in FIG. 1 with the sealing material 19 which includes a glass fiber having a diameter of 7.5 $\mu$m. The cell gap of this liquid crystal cell is 6.9±0.04 $\mu$m, which is good uniformity.

Embodiment 2

Figure 6A:
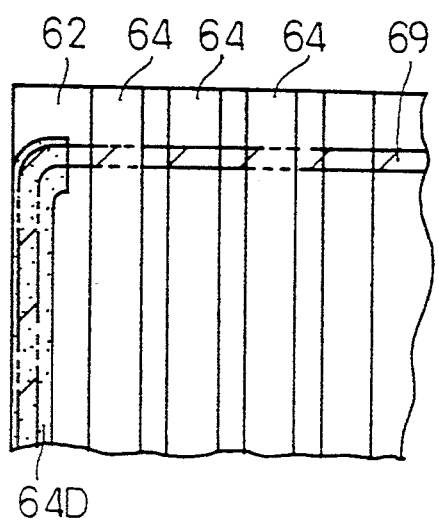
FIG. 6a is a the plan view showing another embodiment of the present invention showing the color filter substrate having the transparent electrode pattern provided on the color filter substrate.
Figure 6B:
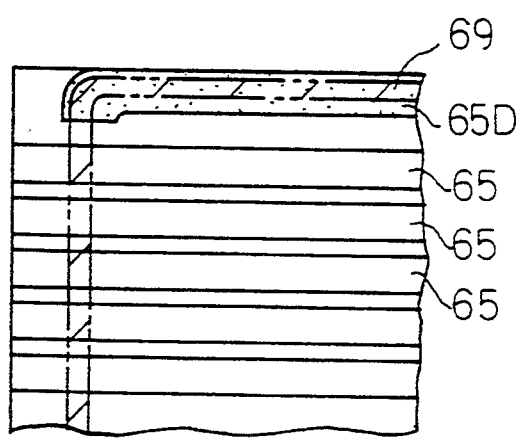
FIG. 6b is a plan view showing another embodiment showing the opposing glass substrate having the transparent electrode pattern.

The liquid crystal cell is manufactured with a dyeing color filter which does not need the transparent electrodes 13 and 13D of FIG. 1. The transparent electrode pattern on the color filter is manufactured by the sputtering film forming method and has a film resistance 15 $\Omega/\square$ and film thickness 0.25 $\mu$m. The transparent electrode pattern on the opposing glass substrate 15 and 15D is manufactured by the plasma ion plating film forming method and has a film resistance 10 $\Omega/\square$ and film thickness 0.15 $\mu$m. These transparent electrodes are disposed as the transparent electrode patterns 64, 64D, 65 and 65D shown in FIG. 6 in the same way as the embodiment 1.

When the liquid crystal cell shown in FIG. 1 is manufactured using the color filter substrate and the opposing glass substrate, said substrate having these particular transparent electrode pattern, good uniformity of the cell gap, 7.2±0.05 $\mu$m, is obtained.

Comparative Embodiment

The following are measured valves of the cell gap of the liquid crystal cell of the prior art having no transparent electrode pattern at the position of the sealing material 19, corresponding to the same structures as in the embodiments 1 and 2.

(1) The same structure as the embodiment 1 7.0±0.12 $\mu$m (2) The same structure as the embodiment 2 7.4±0.14 $\mu$m As stated above, uniformity of the cell gap can be improved by providing a so-called dummy or non-driving electrode at the position of the sealing material of the liquid crystal cell. The color liquid crystal display device providing the above liquid crystal cell has uniform color tone, uniform contrast and good quality of picture.

It is further understood by those skilled in the art that the foregoing description is a preferred embodiment of the disclosed device and that various changes and modifications may be made in the invention without departing from the spirit and scope thereof.

What is claimed is:

1. A color electrooptical device comprising:
   a color filter substrate having a color filter layer and a transparent electrode pattern;
   a transparent substrate having a transparent electrode pattern, said two substrates being spaced apart and facing each other; and
   a liquid crystal sealed between said two substrates through a sealing portion;
   wherein a non-driving transparent electrode is interposed between the sealing portion and the color filter substrate and a non-driving transparent electrode is interposed between the sealing portion and the transparent substrate to provide and maintain a uniform cell gap between said two substrates;
   and wherein an overcoat layer is formed over the color filter layer and on which is formed the transparent electrode pattern, and another non-driving transparent electrode is formed on the color filter substrate beneath the sealing portion and covered by the overcoat layer to provide and maintain the uniform cell gap.

2. A method of manufacturing a color electrooptical device comprising:
   forming a color filter substrate having a color filter layer and a transparent electrode pattern;
   forming a transparent substrate having a transparent electrode pattern;
   facing said two substrates in spaced-apart relation to each other; and
   sealing a liquid crystal between said two substrates through a sealing portion;

wherein a non-driving transparent electrode is formed between the sealing portion and the color filter substrate and a non-driving transparent electrode is formed between the sealing portion and the transparent substrate to provide and maintain a uniform cell gap between said two substrates;

and wherein an overcoat layer is formed over said color filter and on which said transparent electrode pattern is formed, and another non-driving transparent electrode is formed on the color filter substrate beneath the sealing portion and covered by the overcoat layer to provide and maintain the uniform, cell gap.

* * * * *